(12) United States Patent
Lessing et al.

(10) Patent No.: US 9,360,305 B2
(45) Date of Patent: Jun. 7, 2016

(54) TACTILE MICROPROBE ARM FASTENED TO FREESTANDING END OF AN OPTICAL FIBER

(75) Inventors: Ulrich Lessing, Weiler Im Allgaeu (DE); Pawel Drabarek, Tiefenbronn (DE); Gerhard Ortner, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 14/233,110

(22) PCT Filed: Jul. 10, 2012

(86) PCT No.: PCT/EP2012/063503
§ 371 (c)(1),
(2), (4) Date: Apr. 23, 2014

(87) PCT Pub. No.: WO2013/010857
PCT Pub. Date: Jan. 24, 2013

(65) Prior Publication Data
US 2014/0233036 A1      Aug. 21, 2014

(30) Foreign Application Priority Data

Jul. 20, 2011   (DE) .......................... 10 2011 079 447

(51) Int. Cl.
| | |
|---|---|
| *G01B 11/02* | (2006.01) |
| *G01B 11/24* | (2006.01) |
| *G01B 11/30* | (2006.01) |
| *G01B 11/00* | (2006.01) |
| *G01B 9/02* | (2006.01) |

(52) U.S. Cl.
CPC .......... *G01B 11/2441* (2013.01); *G01B 9/0209* (2013.01); *G01B 11/007* (2013.01); *G01B 11/30* (2013.01)

(58) Field of Classification Search
CPC ............ G01B 9/0209; G01B 11/2441; G01B 11/007; G01B 11/30
See application file for complete search history.

(56) References Cited

U.S. PATENT DOCUMENTS

| | | |
|---|---|---|
| 5,118,956 A | 6/1992 | Dunning et al. |
| 5,289,004 A | 2/1994 | Okada et al. |
| 5,408,094 A | 4/1995 | Kajimura |
| 2007/0062266 A1 | 3/2007 | Niwa et al. |

FOREIGN PATENT DOCUMENTS

| | | |
|---|---|---|
| DE | 298 08 683 | 4/1998 |
| DE | 298 23 884 | 6/1998 |
| DE | 103 37 894 | 3/2005 |
| DE | 10 2010 060 833 | 11/2010 |
| EP | 1 058 812 | 12/2000 |

OTHER PUBLICATIONS

International Search Report for PCT/EP2012/063503, dated Sep. 4, 2012.

*Primary Examiner* — Hwa Lee
(74) *Attorney, Agent, or Firm* — Norton Rose Fulbright US LLP

(57) ABSTRACT

A device for the tactile determination of a surface shape of a measuring object includes a micro probe arm having a stylus tip, the micro probe arm being fastened on an optical fiber having a fiber end, which is mounted in a probe housing, a reference mirror is provided in the probe housing, and an optical measuring device is provided for determining the position of the fiber end in relation to the reference mirror. The contactless interferometric determination of the distance between the fiber end of the optical fiber and the reference mirror attached in the probe housing allows precise determination of the surface shape of the measuring object.

5 Claims, 1 Drawing Sheet

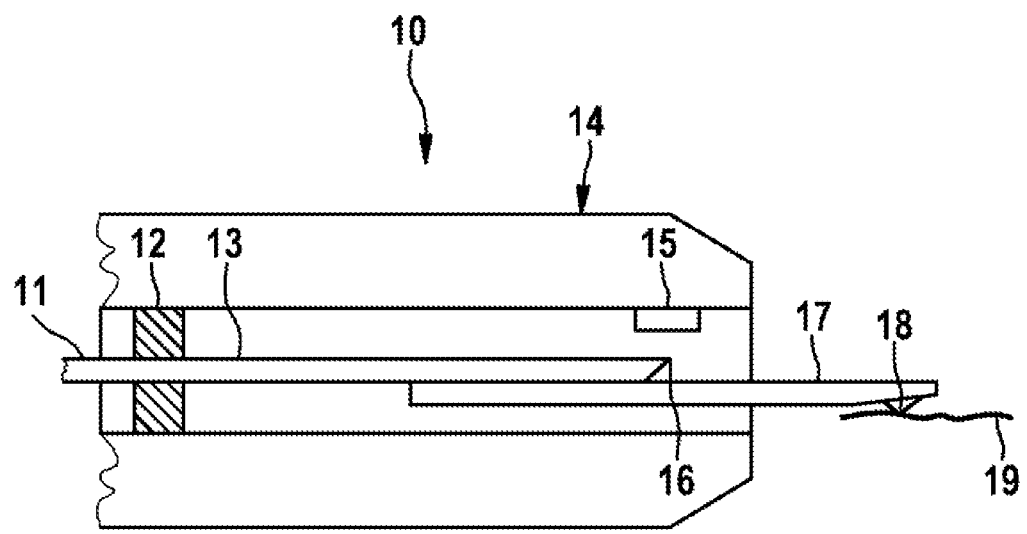

TACTILE MICROPROBE ARM FASTENED TO FREESTANDING END OF AN OPTICAL FIBER

BACKGROUND OF THE INVENTION

1. Field of the Invention

The present invention relates to a device for the tactile determination of a surface shape of a measuring object having a micro probe arm having a stylus tip.

2. Description of the Related Art

Optical measuring systems, which operate in a tactile and interferometric way, having a modulation interferometer and a reference interferometer situated downstream therefrom, are known for acquiring the shape, the diameter, and/or the roughness of surfaces. These measuring systems are used for optical distance measurement, for example, in quality control in the case of the measurement of surface geometries. Published European patent document EP 1 058 812 B1 describes such an interferometric measuring device for acquiring the shape or the distance, in particular of rough surfaces, having at least one beam generation unit, whose spatially coherent radiation is split in a measuring probe of the measuring device into a reference measuring beam, which is guided through a measuring reference branch and reflected therein, and a measuring beam, which is guided through a measuring branch and reflected on the rough surface, having a unit for modulating the light phase or for shifting the light frequency in accordance with a heterodyne frequency of a first partial beam in relation to the light phase or the light frequency of a second partial beam having a superposition unit for superimposing the reflected measuring reference beam with the reflected measuring beam having a beam decomposition and beam reception unit for splitting the superimposed radiation into at least two beams having different wavelengths and converting the radiation into electrical signals and having an analysis unit, in which the shape or the distance of the rough surface is determinable based on a phase difference of the electrical signals. It is provided that the radiation emitted by the beam generation unit is short-coherent and broadband with respect to time, that the beam generation unit, a beam splitter for forming the first and second partial beams, and the unit for phase modulation or frequency shifting are situated in a modular unit, which is spatially spaced apart from the measuring probe and is designed as a modulation interferometer, and that a delay element is situated in the modular unit in the beam path of a partial beam, which results in a difference of the optical path lengths of the two partial beams, which is longer than the coherence length of the radiation emitted by the beam generation unit.

Such interferometric measuring devices, which initially include two interferometers, may be constructed using different types of interferometers. Thus, the modulation interferometer may be constructed as a Mach-Zehnder interferometer, while the measuring interferometer or the measuring probe is constructed compactly, for example, as a Mirau interferometer. The interferometric measuring devices share the feature that a path difference registered in the first interferometer between two partial beams of a short-coherent radiation source is equalized again in the second measuring interferometer or the measuring probe and the partial beams may thus be moved into interference formation. The path difference registered by a delay element in published European patent document EP 1 058 812 B1 may be produced by partial arms of different lengths, through which the partial beams pass, as represented in published European patent document EP 1 058 812 B1 in a modulation interferometer constructed with light conductors.

To improve the measuring precision of the interferometric measuring device, attaching a reference interferometer to a second output of the modulation interferometer is known. It is optically constructed like the measuring interferometer, i.e., it equalizes the path difference registered in the modulation interferometer between the two partial beams again. The design construction of the reference interferometer differs from that of the measuring interferometer, however. The measuring precision of the interferometric measuring device may be improved by comparing the signals of the reference interferometer to those of the measuring interferometer. The path difference to be registered in the modulation interferometer depends on the structural design of the measuring interferometer or the measuring probe.

In addition to the described modulation interferometer, further optical, point-measuring probe systems and measuring methods for determining surface contours and roughnesses are known, for example, autofocus sensors, triangulation, chromatic sensors, and white light interferometers.

Furthermore, tactile probe systems, in which surfaces are sampled using a probe arm, are known. Furthermore, determining the movement of the probe arm by interferometry is known, as is implemented, for example, in the measuring device Form Talysurf Series 2 from Taylor Hobson. In a brochure of the shape measuring machine MFU 100 WP from Mahr, a probe system is described in which an optical or tactile probe arm is used. The analysis systems for the tactile and optical sampling are independent of one another.

In a related application of the applicant, a probe system of a measuring machine having a tactile sampling system having an assigned probe arm for the touching acquisition of the shape, the diameter, and/or the roughness of a surface and having an optical sampling system for the optical acquisition of the shape, the diameter, and/or the roughness of the surface are described, in which an identical optical measuring system having a shared optical analysis unit is used for the acquisition of the deflection of the probe arm of the tactile sampling system and for the optical acquisition of the shape, the diameter, and/or the roughness of the surface by the optical sampling system. The probe arm is mounted so it is rotatable in this case and its deflection is determined by interferometry.

BRIEF SUMMARY OF THE INVENTION

It is the object of the present invention to provide a cost-effective probe system, which allows tactile acquisition of the shape of surfaces with high precision.

The object of the present invention is achieved in that the micro probe arm is fastened on an optical fiber having a fiber end, which is mounted in a probe housing, a reference mirror is provided in the probe housing, and an optical measuring device is provided for determining the position of the fiber end in relation to the reference mirror.

The device according to the present invention allows a cost-effective tactile determination of the shape of a measuring object, such as its roughness. By way of the mounting of the micro probe arm on the freestanding optical fiber, no mechanical joint is necessary for the micro probe arm. The contactless interferometric determination of the distance between the fiber end of the optical fiber and the reference mirror attached in the probe housing allows particularly precise determination of the surface shape of the measuring object, such as the diameter of a micro-borehole or the roughness of a surface.

If an interferometer is provided as an optical measuring device, the determination of the position of the probe arm may take place particularly precisely and without play.

In one preferred embodiment, a short-coherent interferometer is provided as an interferometric measuring device. Interferometers having a short-coherent radiation source represent a proven system for determining the distance between the end of an optical fiber and a reference element. In a short-coherent heterodyne interferometer known per se, the light of a short-coherent light source is split in a modulation interferometer into two partial beams, one of which is shifted in the frequency with the aid of an acousto-optic modulator. The frequency difference of the two partial beams is 100 kHz, for example. In one arm of the modulation interferometer, a delay section is provided, which produces a difference of the optical paths of the two partial beams, which is longer than the coherence length of the light used. The two partial beams are superimposed in a beam splitter, coupled into a light conductor, and supplied to a reference probe and the optical fiber, which leads into the micro probe. Because of the optical path difference of the partial beams, they do not interfere. The reference probe and the measuring probe formed from the optical fiber and the reference mirror are implemented as an interferometer according to Michelson or Fizeau in such a way that the optical path difference of the superimposed partial beams corresponds to the path difference of the modulation interferometer, so that interference of the partial beams occurs and the distance between the fiber end of the optical fiber in the micro probe and the reference mirror may be determined from the phase difference of the partial beams.

If at least two light wavelengths are provided for the phase determination in the interferometer, on the one hand, a great path range having an unambiguous phase determination may be covered and, on the other hand, the path may be determined with high precision. In the case of a two-wavelength interferometer having wavelengths $\lambda 1$ and $\lambda 2$, the distance $\Delta L$ to be determined is calculated from the phase difference $(\phi 1-\phi 2)$ of the signals as:

$$\Delta L = (\phi 1-\phi 2)/(4*\pi)*(\lambda 1*\lambda 2)/(\lambda 1-\lambda 2)$$

In this case, $(\lambda 1*\lambda 2)/(\lambda 1-\lambda 2)$ is designated as a "synthetic wavelength." If wavelengths $\lambda 1=1560$ μm and $\lambda 2=1530$ μm are used in the two-wavelength interferometer, the synthetic wavelength is 79.6 μm, so that distances $\Delta L$ in a range of ±19.9 μm may be unambiguously determined.

If a phase interferometer or heterodyne interferometer is provided as a measuring device, the position of the micro probe arm may be unambiguously determined over a particularly large path.

The device according to the present invention is particularly suitable for use in a shape measuring machine, a coordinate measuring machine, or a multisensor measuring machine.

The present invention will be described in greater detail hereafter on the basis of an exemplary embodiment illustrated in the FIGURE.

BRIEF DESCRIPTION OF THE DRAWING

FIG. 1 schematically shows a micro probe for tactile shape determination.

DETAILED DESCRIPTION OF THE INVENTION

FIG. 1 shows a micro probe 10 for tactile shape determination of a measuring object 19. Measuring object 19 is sampled in a tactile way using a micro probe arm 17 having a stylus tip 18. For example, the roughness of the surface of measuring object 19 may thus be determined. Micro probe arm 17 is fastened on an optical fiber 13, which is mounted with the aid of a fiber mount 12 in a probe housing 14. Radiation may be coupled into optical fiber 13 and decoupled therefrom at a fiber exit 11 on probe housing 14. Coupled radiation reaches a fiber end 16, from which it is incident on a reference mirror 15 attached to probe housing 14. Radiation reflected back on reference mirror 15 is coupled into fiber end 16 and exits again at fiber exit 11. To determine the distance between fiber end 16 and reference mirror 15, fiber exit 11 is connected to a short-coherent heterodyne interferometer known per se (not shown). By mounting micro probe arm 17 on the freestanding end of optical fiber 13 in probe housing 14, the elasticity of optical fiber 13 may be used to absorb the movements of micro probe arm 17 and the contact pressure of stylus tip 18 on measuring object 19 with predetermined pressure. In particular, a mechanical bearing, such as a pivot joint, for micro probe arm 17 is not necessary.

What is claimed is:

1. A device for the tactile determination of a surface shape of a measured object, comprising:
 a probe housing;
 a reference mirror provided in the probe housing;
 an optical fiber having a fiber end and a fiber exit, wherein the optical fiber is mounted in the probe housing;
 a micro probe arm having a stylus tip, wherein the micro probe arm is fastened on the optical fiber at the fiber end; and
 an optical measuring device configured to determine the position of the fiber end in relation to the reference mirror, wherein radiation is coupled into the optical fiber at the fiber exit and directed toward the fiber end, radiation from the fiber end impinges upon the reference mirror, and radiation reflecting from the reference mirror being coupled to the fiber end and exiting at the fiber exit.

2. The device as recited in claim 1, wherein an interferometer is provided as the optical measuring device.

3. The device as recited in claim 2, wherein the interferometer is a short-coherent interferometer.

4. The device as recited in claim 2, wherein the interferometer is configured to determine a phase difference between a first light wavelength and a second light wavelength.

5. The device as recited in claim 2, wherein the interferometer is one of a phase interferometer or a heterodyne interferometer.

* * * * *